United States Patent Office 2,987,956
Patented June 13, 1961

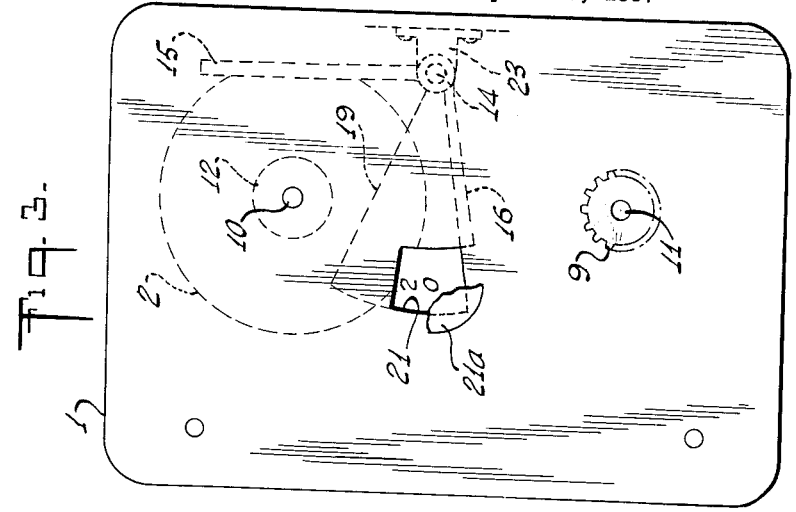
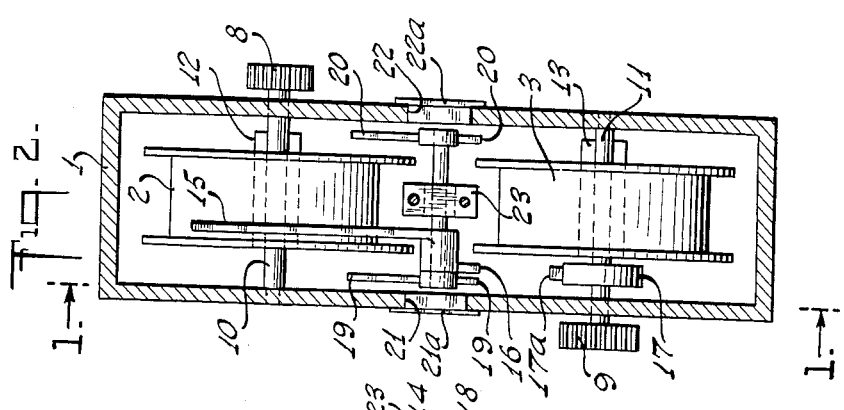
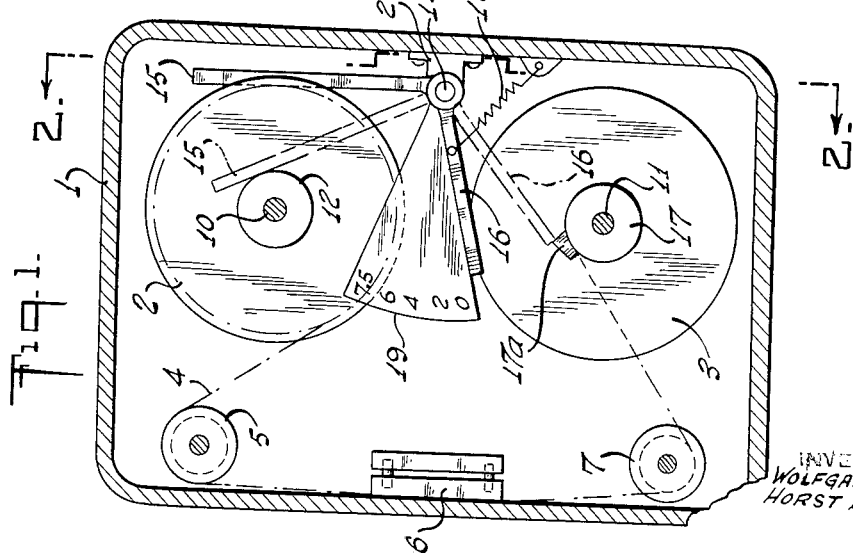

2,987,956
MOVIE CAMERA WITH REVERSIBLE MAGAZINE FOR DOUBLE TRACK EXPOSURE
Wolfgang Planert and Horst Stühmke, Dresden, Germany, assignors to VEB Kamera- und Kinowerke Dresden
Filed Apr. 19, 1957, Ser. No. 653,998
Claims priority, application Germany May 3, 1956
1 Claim. (Cl. 88—17)

This invention relates to movie cameras having reversible magazines for double track exposure and more particularly to control means incorporated therein for preventing the film from running off the feed reel after the first run through of the film.

In movie cameras of the type having reversible magazines for double track exposure, it is necessary to include means for preventing the film from running completely off of the feed reel after the first run through of the film, thus enabling the magazine to be ready for immediate reversal.

Heretofore this problem has been solved in one instance by the provision of a control member which slides on the circumference of the film reel and which gauges the diameter thereof and stops the drive mechanism after a predetermined length of film has been run off. In one arrangement of this type, the stop means is located within the camera and the control member thereof which slides on the film reel is located within the magazine. The connection between these two elements, i.e., the control member sliding on the film reel and the stop means located within the camera, has to be effected through the magazine wall. This is a serious disadvantage inasmuch as it introduces considerable complication of structure as well as affecting the reliability of the magazine itself.

Another attempt to solve this problem of stopping the drive mechanism after a predetermined length of film has been run through resides in the provision of a film length counter located within the camera magazine. This means is also quite complicated inasmuch as control means have to be provided which will reset the counter to zero when the magazine is removed from the camera. In such an arrangement means also have to be provided for removing the blocking arrangement for the drive mechanism.

It is accordingly a principal object of the present invention to provide a relatively simple means for preventing the film from running off the feed reel after the first run through of the film and which overcomes the above disadvantages.

It is another object of the present invention to provide control means of the above type which includes a V-shaped lever which acts as the control member and wherein on arm thereof contacts the periphery of the film feed reel and the other arm engages a cam disc after the first run through of the film to automatically stop the motion of the take up reel, both the control member and the cam disc being located within the magazine.

It is still another object of the present invention to provide control means of the above type which is entirely self-contained within the magazine to permit greater simplicity and operating dependability.

It is still another object of the present invention to provide control means of the above type which includes a calibrated dial connected to the free arm of the control member to permit a visual reading of the amount of film which has been run through. Thus the structural elements which are used for the stopping of the take up reel also serve for the counting arrangement with an attendant simplification of structure. In order to enable the readings of the used film length in either of the two runs, such dials are arranged on either side of the magazine.

Other objects of the invention are to provide a control means for movie cameras which is of simple construction, has a minimum number of parts, is inexpensive to manufacture and efficient in operation.

For other objects and for a better understanding of the invention, reference may be had to the following detailed description taken in connection with the accompanying drawing, in which:

FIGURE 1 is a vertical sectional view taken along the line 1—1 of FIG. 2;

FIGURE 2 is a vertical sectional view taken along the line 2—2 of FIG. 1; and

FIGURE 3 is a side elevational view of the magazine and illustrating in dotted outline the invention incorporated therein.

Referring now more in detail to the drawing, 1 represents a hollow rectangular magazine housing of conventional design having the usual film gate or pressure plate 6 in the narrow front wall thereof, substantially as illustrated.

A pair of vertically spaced and vertically aligned winding shafts 10 and 11 are provided and have their opposite ends journalled in the side walls of the housing or magazine 1.

A drive gear 8 is secured to one end of the winding shaft 10 external of the magazine 1 while a second drive gear 9 is similarly secured to the external end of the winding shaft 11, the drive gears 8 and 9 being disposed on opposite sides of the magazine housing 1.

A film reel 2 is mounted on the winding shaft 10 by means of a friction clutch 12 while a second film reel 3 is similarly mounted on the winding shaft 11 by means of the friction clutch 13.

An idler roller 5 is rotatably mounted within the magazine housing 1 behind the front wall at the top thereof while a second idler roller 7 is similarly mounted at the bottom (FIG. 1).

The film 4 passes from the feed roll 2 (FIG. 1) over the idler roller 5 downwardly across the film gate 6 and around the idler roller 7 and onto the take up reel 3 in the usual manner. In a manner well known to those skilled in the art, the reels 2 and 3 are used alternately as feed and take up reels. Thus, by means of the drive gears 8 and 9 both reels are alternately connected to the drive mechanism of the camera, not shown.

In the position shown in FIG. 1, the reel 9 serves as the take up reel, as will be obvious.

In the practice of my invention a transverse shaft 14 is rotatably mounted on the inside of the rear wall of the magazine 1 intermediate the reels 2 and 3 (FIG. 1) by means of a bearing bracket 23, the free ends of the shaft 14 terminating short of the inner faces of the side walls of the magazine (FIG. 2).

A V-shaped control member is secured near one end of the shaft 14 and includes an arm 15 adapted to engage the periphery of the film 4 on the reel 2 and a free arm 16. The free arm 16 is offset laterally and outwardly of the arm 15 and is adapted to engage the cam tooth 17a of a cam disc 17 which is secured to the shaft 11. The arm 15 is retained in tensional engagement with the periphery of the film 4 on the feed reel 2 by means of the spring 18, one end of which is connected to the arm 16 and the other to the rear wall of the housing 1 (FIG. 1). Thus, the arm 15 of the control member contacts the diameter of the feed reel 2 and is rotatable about the shaft 14. The free arm 16 is adapted to engage the tooth 17a of the cam disc 17. The drive gear 9 provides the drive to the take up reel 3 through the friction clutch 13. When the control member reaches the position shown in dotted outline in FIG. 1 (in which position nearly the entire film 4 is unwound from reel 2) the end of the free arm 16 seats itself behind the cam tooth 17a. Since the cam 17 is affixed to shaft 11, rotation of this shaft and the drive gear 9 is effective to stop the complete driving mechanism to which the gear 9 is connected. Since the clutch plate 13 is on the shaft 11 it also stops rotating, causing the reel 3 which is positioned thereon to stop rotation also.

In order to expose the second picture track, the magazine 1 is then rotated through 180 degrees in the usual manner. The film is then run through a second time. However, this time it may be unwound completely from the reel 3 (the reel 2 is now the take up reel) without the driving mechanism being stopped inasmuch as the drive gear 9 is no longer connected to the drive mechanism in this position of the housing.

In the further practice of my invention, a pair of oppositely disposed substantially triangular dials 19 and 20 are suitably secured to the ends of the shaft 14 within the housing and are visible through the openings 21 and 22 provided therefor. (Corresponding openings will also be provided in the camera walls, not shown.) The dials 19 and 20 along their arcuate edges remote from the shaft 14 are provided, on their outer faces, with suitable calibrations substantially as illustrated, the calibrated scales on each of the dials extending in opposite directions from each other. The calibrations of the dial for the second run may start with zero, or in the case of "double eight" film it may start with 7.5 meters, which latter is naturally a continuation from the end of the dial reading of the first run.

To facilitate the loading of the reel 2 into the magazine 1, the dial 19 is coupled to the shaft 14 by means of a spring-loaded pivotal connection, not shown, which permits the rotational movement of the dial 19 relative to the control member, as will be obvious.

To avoid double exposure (which may occur if the magazine is removed without the entire film being used up and reinserted at a later time, in order to use up the remaining part of the film), a cover 21a, 22a is provided for optionally closing up the openings 21, 22, respectively, for covering the dial not in use (which may be the dial of the already used or not yet used track), or both.

While various changes may be made in the detail construction, it shall be understood that such changes shall be within the spirit and scope of the present invention as defined by the appended claim.

What we claim as new and desire to protect by Letters Patent of the United States is:

In a movie camera having a reversible magazine with a first and a second reel for double track exposure, one of said reels acting as a feed reel and the other as a take-up reel, means for rotating said first reel, means for rotating said second reel, a substantially V-shaped control member having first and second arms rotatably mounted on a shaft at the juncture of said arms and mounted at the central portion of the reversible magazine and intermediate said first and second reels, said control member having a first arm adapted to contact the periphery of the film on the first reel and a second arm laterally offset outwardly of said first arm, a cam disc connected to said second rotating means in vertical alignment with said second arm, said cam disc having a cam tooth adapted to be engaged by the free end of said second arm after a predetermined amount of film has been run through, friction clutch means operatively interconnecting said rotating means and said second reel, a pair of calibrated sector-shaped dials calibrated to read in counter rotational directions from each other to provide readings for the first and second run through, respectively, of the film and connected integrally with said control member and rotatable therewith, said reversible magazine having first and second openings on each side of said magazine providing visual access to said pair of calibrated dials, said first and second calibrated dials being disposed on opposite sides of said reels, and removable covers for each of said openings in said magazine to cover the dial which is not being used to provide thereby an indication which of said double tracks is being exposed.

References Cited in the file of this patent

UNITED STATES PATENTS

| | | |
|---|---|---|
| 2,039,697 | Wittel | May 5, 1936 |
| 2,080,086 | Mihalyi | May 11, 1937 |
| 2,089,330 | Becker | Aug. 10, 1937 |
| 2,326,654 | Jagust | Aug. 10, 1943 |
| 2,427,585 | Williams | Sept. 16, 1947 |